United States Patent [19]
Jeon

[11] Patent Number: 6,038,372
[45] Date of Patent: Mar. 14, 2000

[54] CROSSTALK REMOVING APPARATUS DURING DIGITAL MAGNETIC REPRODUCTION

[75] Inventor: Jin-Kyu Jeon, Suwon, Rep. of Korea

[73] Assignee: Samsung Electronics Co., Ltd., Kyungki-do, Rep. of Korea

[21] Appl. No.: 08/791,141

[22] Filed: Jan. 30, 1997

[30] Foreign Application Priority Data

Jan. 30, 1996 [KR] Rep. of Korea .......... 96-2093

[51] Int. Cl.[7] .................................. H04N 5/76
[52] U.S. Cl. ................................. 386/115; 386/22
[58] Field of Search .................. 386/22, 23, 24, 386/25, 114, 115, 116; 360/65, 67; H04N 5/911, 5/92, 5/76, 9/79

[56] References Cited

U.S. PATENT DOCUMENTS

| | | |
|---|---|---|
| 4,577,238 | 3/1986 | Watanabe ............................. 386/22 |
| 4,896,220 | 1/1990 | Sato et al. ............................ 386/23 |
| 5,257,146 | 10/1993 | Price, Jr. et al. .................... 360/67 |
| 5,299,002 | 3/1994 | Funayama ........................... 386/25 |
| 5,596,559 | 1/1997 | Hiramatsu ........................... 360/65 |

*Primary Examiner*—Thai Tran
*Attorney, Agent, or Firm*—Sughrue, Mion, Zinn, Macpeak & Seas, PLLC

[57] ABSTRACT

A crosstalk removing apparatus for digital magnetic reproduction is provided in which a clamp circuit is connected between a playback amplifier and a playback equalizer. An effect of crosstalk from a neighboring track is effectively removed using the clamp circuit including two capacitors, two diodes and a load resistor. The clamp circuit improves a quality of picture of the reproduced signal while maintaining compatibility between recording a reproducing apparatus.

3 Claims, 3 Drawing Sheets

CROSSTALK REMOVING APPARATUS DURING DIGITAL MAGNETIC REPRODUCTION

BACKGROUND OF THE INVENTION

The present invention relates to an apparatus for removing crosstalk during reproduction of a signal recorded on a magnetic tape. More particularly, the invention relates to a crosstalk removing apparatus used to remove a crosstalk component caused by a neighboring track when reproducing a high density signal magnetically recorded in digital form without a guard band.

A digital signal is recorded with a high density on a digital magnetic recording medium in a digital video cassette recorder (VCR). Generally, an azimuth type head is adopted for high density recording, and a recording frequency is increased for enhancing the azimuth effect. When the azimuth effect is increased by raising a recording frequency, it is possible to remove a guard band between recording tracks on a tape, which increases the amount of information that may be recorded on a tape.

In a digital magnetic recording and reproducing apparatus, where the digital signal is recorded at a high density without a guard band between tracks, reproduction is susceptible to crosstalk interference. Specifically, the signal recorded on a recording medium is reproduced and amplified in a playback amplifier to a predetermined magnitude to output the amplified signal. During reproduction, an interference signal from a neighboring track may be simultaneously reproduced to degenerate the quality of picture produced by the amplified signal. The interference signal from the neighboring track is called crosstalk which results from high density recording without a guard band.

SUMMARY OF THE INVENTION

To solve the above problem, it is an object of the present invention to provide a crosstalk removing apparatus for digital magnetic reproduction that is compatible with existing apparatus. The present invention enhances the quality of picture by effectively removing crosstalk between neighboring tracks using a clamp circuit. The clamp circuit is connected between a playback amplifier and a playback equalizer of a reproducing device.

To accomplish the above object of the present invention, there is provided a crosstalk removing apparatus for digital magnetic reproduction for connection between a playback amplifier and a playback equalizer in a digital reproduction apparatus, said crosstalk removing apparatus comprising:

a first capacitor for removing a direct current component from a reproduced signal amplified to a predetermined magnitude and outputting an alternating current component of the amplified signal;

a load resistor;

a plurality of diodes connected in parallel with each other between the first capacitor and the load resistor, each diode being oriented in the opposite direction with respect to at least one other diode of said plurality of diodes, wherein said diodes pass a signal having a level more than a positive level and less than a negative level of a crosstalk noise component of the reproduced signal having passed through the first capacitor; and a second capacitor for removing a direct current component from the signal having passed through the plurality of the diodes and outputting only an alternating current component of the passed signal to the playback equalizer.

BRIEF DESCRIPTION OF THE DRAWINGS

The preferred embodiments of the present invention are described with reference to the drawings wherein.

DETAILED DESCRIPTION OF THE PREFERRED EMBODIMENT OF THE INVENTION

A preferred embodiment of the present invention will be described in detail with reference to the accompanying drawings.

Figure 1:
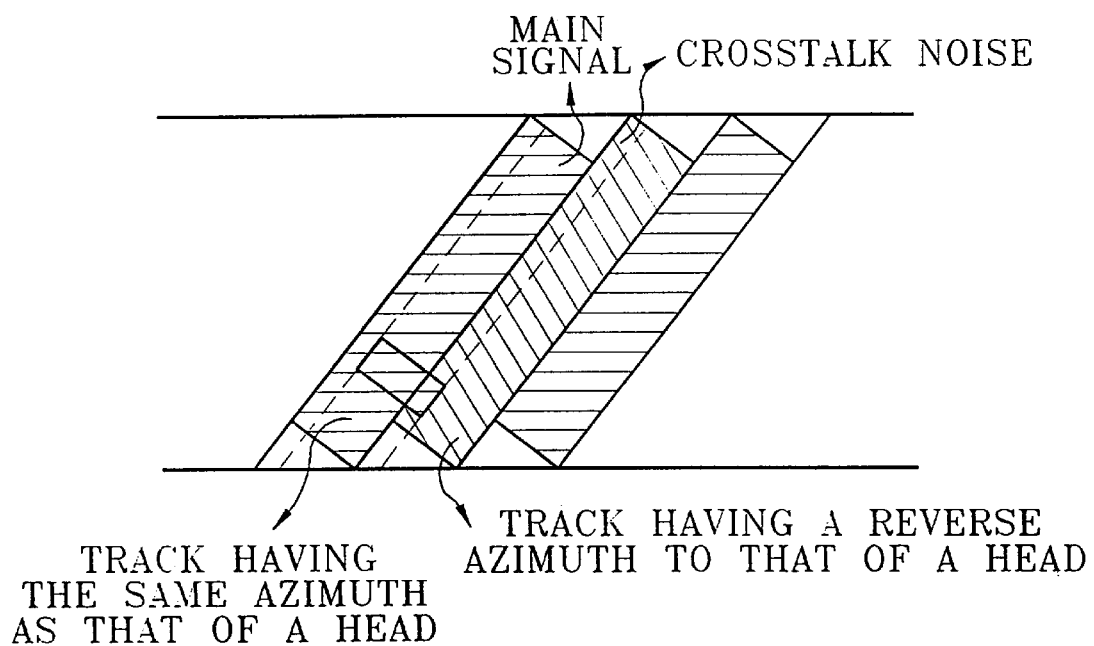
FIG. 1 is a view showing the structure of tracks of a magnetic recording medium.

FIG. 1 shows the structure of recorded tracks of a magnetic recording medium recorded by two heads A-HD and B-HD each having a respective azimuth. Here, the two heads have an azimuth reverse to each other, which is shown by the difference in angle of the diagonal lines. When a head travels over tracks having a first azimuth on a high density recorded tape with no guard band, crosstalk is generated from the concurrent reproduction of signals from adjacent tracks having the reverse azimuth from the first azimuth. The apparatus for removing the crosstalk according to the present invention is shown in FIG. 2.

Figure 2:
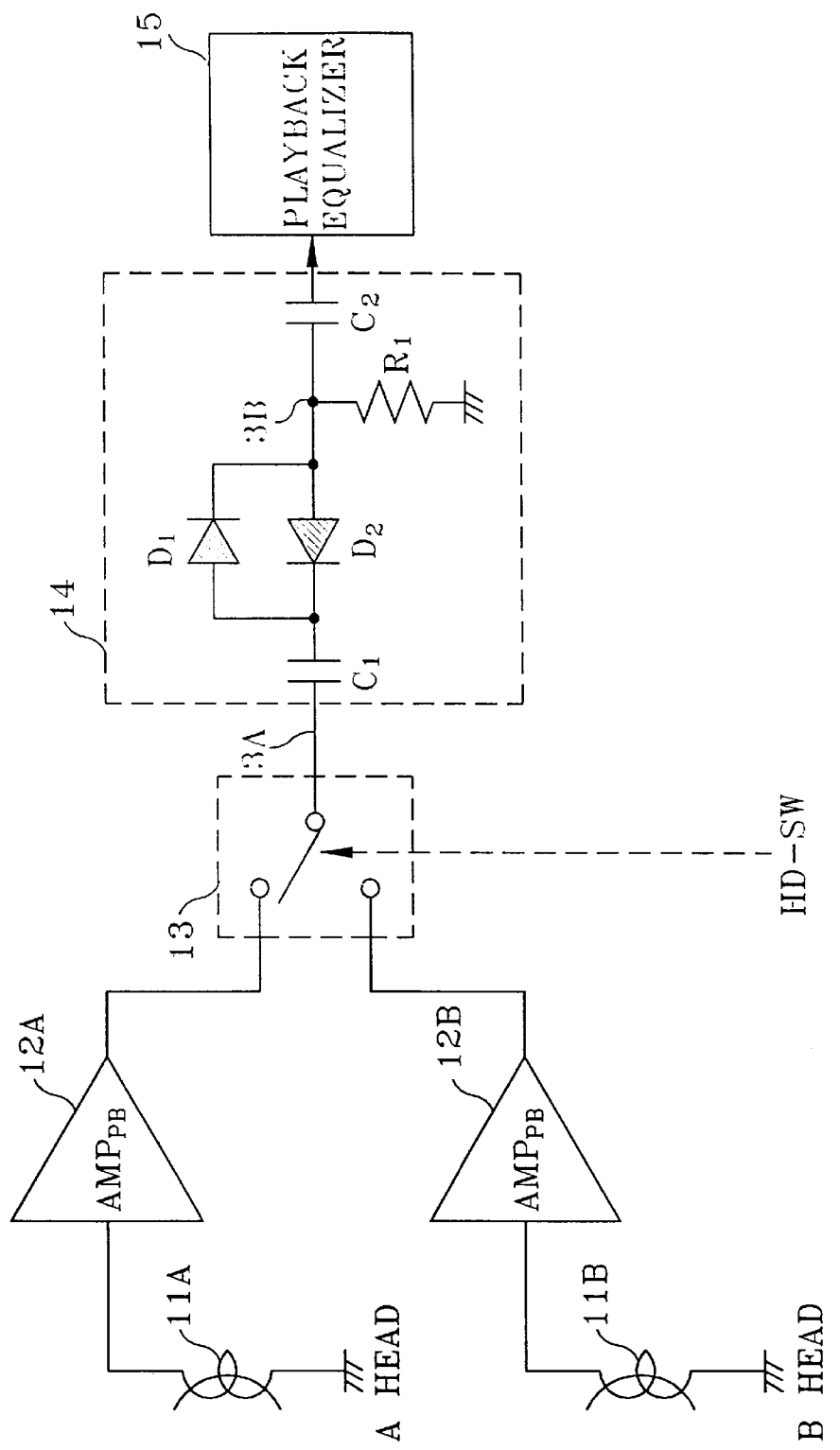
FIG. 2 is a block diagram of a crosstalk removing apparatus for reproduction of a digital magnetic recording medium according to one embodiment of the present invention.

FIG. 2 is a block diagram of a crosstalk removing apparatus according to one embodiment of the present invention. In FIG. 2, the apparatus includes a crosstalk remover 14 for removing a crosstalk noise component from a reproduced signal which is located at the front end of a playback equalizer 15 of a digital magnetic recording and reproduction apparatus. The crosstalk remover 14 comprises a clamp circuit including capacitors $C_1$ and $C_2$, diodes $D_1$ and $D_2$, and a resistor $R_1$.

Figure 3A:
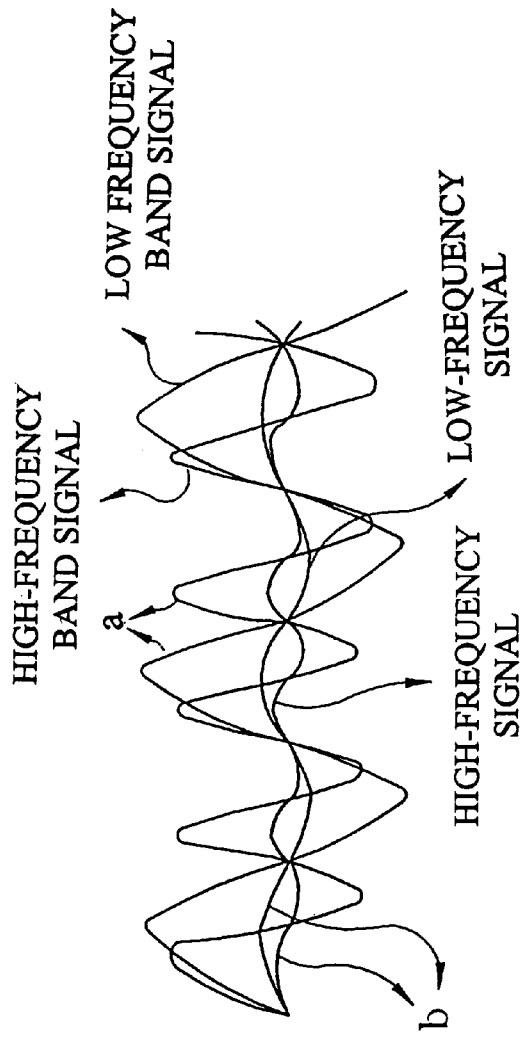
FIGS. 3A and 3B are timing diagrams of input and output signals of the apparatus shown in FIG. 2.
Figure 3B:
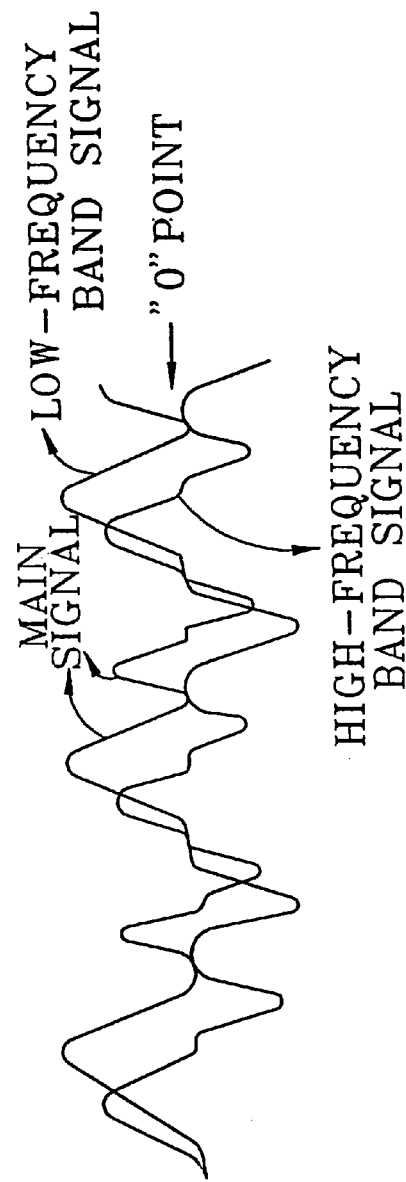

The operation of the crosstalk removing apparatus will be described below in more detail with reference to the drawings. FIGS. 3A and 3B are timing diagrams of input and output signals of the crosstalk removing apparatus shown in FIG. 2.

In FIG. 2, two heads 11A and 11B alternatively travel over corresponding tracks according to a head switching signal HD-SW output from a controller (not shown). Main signals are read from a recording medium having a track pattern as shown in FIG. 1. The read main signals are input to playback amplifiers 12A and 12B which are correspondingly connected to corresponding heads 11A and 11B. The playback amplifiers 12A and 12B amplify the input main signals to a predetermined magnitude and output the amplified signals to a switch 13. The switch 13 selectively outputs the amplified main signals from the playback amplifiers according to a head switching signal HD-SW applied from a controller (not shown), to the crosstalk remover 14. Here, since the main signal input to the crosstalk remover 14 is a reproduced signal from a track having the same azimuth as that of the head, the level of the main signal is very large as shown in FIG. 3A. If a runlength of a recording signal is shortened, a main signal "a" becomes a high-frequency band signal, while if the runlength is lengthened, the main signal becomes a low-frequency band signal. Also, because the medium is recorded with a high density signal without a guard band, the main signal "a" includes a reproduced signal from a neighboring track having a reverse azimuth from that of a current playback head. This signal from a neighboring track is crosstalk noise component "b." The crosstalk noise component "b" attenuates the level of the reproduced signal from the playback head. Also, the crosstalk noise component "b" includes a high-frequency signal and a low-frequency signal according to a runlength of a recording signal in the track. The crosstalk remover 14 which receives a reproduced signal as shown in FIG. 3A removes the crosstalk noise component "b" included in the reproduced signal to output a reproduced signal as shown in FIG. 3B.

A clamp circuit crosstalk remover 14 eliminates crosstalk by removing a direct current (DC) component of the reproduced signal of FIG. 3A via a capacitor $C_1$ to extract only an alternating current (AC) component. The reproduced signal of FIG. 3A having only the AC component passes through two diodes $D_1$ and $D_2$ which are connected in parallel and in a reverse direction with respect to each other, so that a small signal level where positive and negative crosstalk noise components "b" are distributed is interrupted and only the main signal portion having a higher level is passed. The interrupted crosstalk signal generally has a predetermined magnitude with respect to the main desired signal component. As described above, after being passed through the two diodes $D_1$ and $D_2$, the crosstalk noise component is removed as shown in FIG. 3B. It can also be seen that zero point portions of the main signal having a higher level are not interrupted by the two diodes $D_1$ and $D_2$ from the reproduced signal shown in FIG. 3B. The capacitor $C_2$ interrupts a DC component of the reproduced signal of FIG. 3B and transfers an AC component thereof to a playback equalizer 15. Here, the resistor $R_1$ is a load resistor. Only the AC component of the reproduced signal of FIG. 3B is input to the playback equalizer 15 to undergo waveform equalization.

As described above, the present invention relates to a crosstalk removing apparatus during digital magnetic reproduction, in which a clamp circuit processes the reproduced signal before the signal is input to a playback equalizer in a digital magnetic recording and reproducing apparatus such as a digital VCR which performs a high density recording without a guard band. The apparatus thereby removes crosstalk noise components included in a reproduced signal amplified to a predetermined magnitude via the playback amplifier. As a result, degeneration of a quality of picture can be prevented without modifying the specifications for the digital VCR.

While only certain embodiments of the invention have been specifically described herein, it will apparent that numerous modifications may be made thereto without departing from the spirit and scope of the invention.

What is claimed is:

1. A crosstalk removing apparatus for digital magnetic reproduction of a digital signal recorded on a recording medium, the crosstalk removing apparatus being operably connected between a playback amplifier and a playback equalizer in a digital reproduction apparatus and comprising:

a first capacitor for removing a direct current component from a reproduced signal amplified to a predetermined magnitude by the playback amplifier and outputting an alternating current component of the amplified signal;

a load resistor;

a plurality of diodes connected in parallel with each other between said first capacitor and the load resistor, each diode being oriented in the opposite direction with respect to one other diode of said plurality of diodes, wherein said diodes pass a signal having a level more than a positive level and less than a negative level of a crosstalk noise component of the reproduced signal having passed through said first capacitor; and a second capacitor for removing a direct current component from the signal having passed through said plurality of the diodes and outputting only an alternating current component of said passed signal to the playback equalizer.

2. A crosstalk removing apparatus for digital magnetic reproduction of a digital signal recorded on a recording medium for use in a digital reproduction apparatus, said crosstalk removing apparatus comprising:

a playback amplifier;

a playback equalizer; and a clamping means for receiving an amplified signal from said playback amplifier and for outputting a data signal to said playback equalizer, and for removing a crosstalk component of the amplified signal by passing the amplified signal having a level more than a positive level and less than a negative level of the crosstalk component wherein said clamping means comprises:

a first capacitor for removing a direct current component from the amplified signal received from said playback amplifier and outputting an alternating current component of the amplified signal;

a load resistor;

a plurality of diodes connected in parallel with each other between said first capacitor and the load resistor, each diode being oriented in the opposite direction with respect to one other diode of said plurality of diodes, wherein said diodes pass a signal having a level more than a positive level and less than a negative level of a crosstalk noise component of the amplified signal having passed through said first capacitor; and a second capacitor for removing a direct current component from the signal having passed through said plurality of diodes and outputting only an alternating current component of said passed signal to said playback equalizer.

3. A crosstalk removing apparatus of for digital magnetic reproduction of a digital signal recorded on a recording medium for use in a digital reproduction apparatus, said crosstalk removing apparatus comprising:

a playback amplifier;

a playback equalizer; and a clamping means for receiving an amplified signal from said playback amplifier and for outputting a data signal to said playback equalizer, and for removing a crosstalk component of the amplified signal by passing the amplified signal having a level more than a positive level and less than a negative level of the crosstalk component wherein said clamping means comprises:

a first capacitor for removing a direct current component from the amplified signal received from said playback amplifier and outputting an alternating current component of the amplified signal;

a load resistor;

a plurality of diodes connected in parallel with each other between said first capacitor and the load resistor, each diode being oriented in the opposite direction with respect to one other diode of said plurality of diodes, wherein said diodes pass a signal having a positive level that is more than a predetermined positive level and pass a signal having a negative level that is less negative than a predetermined negative level to remove a crosstalk noise component of the amplified signal;

a second capacitor for removing a direct current component from the signal having passed through said plurality of diodes and outputting only an alternating current component of said passed signal to said playback equalizer.

* * * * *